United States Patent
Lourenco et al.

(10) Patent No.: US 10,968,725 B2
(45) Date of Patent: Apr. 6, 2021

(54) METHOD OF EXTRACTING COAL BED METHANE USING CARBON DIOXIDE

(71) Applicants: 1304342 Alberta Ltd., Edmonton (CA); 1304338 Alberta Ltd., Edmonton (CA)

(72) Inventors: Jose Lourenco, Edmonton (CA); Mackenzie Millar, Edmonton (CA)

(73) Assignees: 1304338 Alberta Ltd., Edmonton (CA); 1304342 Alberta Ltd., Edmonton (CA)

( * ) Notice: Subject to any disclaimer, the term of this patent is extended or adjusted under 35 U.S.C. 154(b) by 0 days.

(21) Appl. No.: 16/077,385

(22) PCT Filed: Jan. 20, 2017

(86) PCT No.: PCT/CA2017/050062
§ 371 (c)(1),
(2) Date: Aug. 10, 2018

(87) PCT Pub. No.: WO2017/136920
PCT Pub. Date: Aug. 17, 2017

(65) Prior Publication Data
US 2019/0040720 A1     Feb. 7, 2019

(30) Foreign Application Priority Data
Feb. 11, 2016   (CA) ................................ CA 2920656

(51) Int. Cl.
*E21B 43/00*      (2006.01)
*H01M 8/0612*     (2016.01)
(Continued)

(52) U.S. Cl.
CPC .......... *E21B 43/006* (2013.01); *B01D 53/002* (2013.01); *B01D 53/265* (2013.01);
(Continued)

(58) Field of Classification Search
CPC ............... E21B 43/006; E21B 41/0064; E21B 41/0057; E21B 41/005; H01M 8/04097;
(Continued)

(56) References Cited

U.S. PATENT DOCUMENTS

| 2,446,925 A | 8/1948 | Hemminger |
| 2,495,613 A | 1/1950 | Tuttle |

(Continued)

FOREIGN PATENT DOCUMENTS

| CA | 1098852 A1 | 4/1981 |
| CA | 2691392 A1 | 2/2007 |

(Continued)

OTHER PUBLICATIONS

International Search Report dated Aug. 26, 2010, issued in International Application No. PCT/CA2010/000530, filed Apr. 7, 2010, 3 pages.

(Continued)

*Primary Examiner* — Angela M DiTrani Leff

(57) ABSTRACT

A method to extract methane from a coal bed seam with carbon dioxide produced and recovered from a fuel cell anode exhaust stream while simultaneously sequestering the carbon dioxide on the coal. The process produces methane to supply a fuel cell to generate electricity while reducing or eliminating GHG emissions.

9 Claims, 1 Drawing Sheet

(51) Int. Cl.
*B01D 53/00* (2006.01)
*B01D 53/26* (2006.01)
*H01M 8/04089* (2016.01)
*H01M 8/0662* (2016.01)
*E21B 41/00* (2006.01)
*H01M 8/0668* (2016.01)
*C10L 3/06* (2006.01)

(52) U.S. Cl.
CPC ..... *E21B 41/0064* (2013.01); *H01M 8/04097* (2013.01); *H01M 8/0612* (2013.01); *H01M 8/0662* (2013.01); *H01M 8/0668* (2013.01); *B01D 2257/504* (2013.01); *B01D 2257/80* (2013.01); *C10L 3/06* (2013.01); *Y02C 20/20* (2013.01)

(58) Field of Classification Search
CPC ............ H01M 8/0612; H01M 8/0662; H01M 8/0668; C10L 3/06; Y02C 20/20; Y02C 20/40; Y02C 00/00; B01D 2257/504; B01D 2257/80; B01D 53/002; B01D 53/265
See application file for complete search history.

(56) References Cited

U.S. PATENT DOCUMENTS

| | | | |
|---|---|---|---|
| 4,094,767 | A | 6/1978 | Gifford, II |
| 4,187,672 | A | 2/1980 | Rasor |
| 4,213,826 | A | 7/1980 | Eddinger et al. |
| 4,265,736 | A | 5/1981 | Thayer |
| 4,306,961 | A | 12/1981 | Taciuk |
| 4,323,446 | A | 4/1982 | Chervenak et al. |
| 4,404,086 | A | 9/1983 | Oltrogge |
| 4,459,201 | A | 7/1984 | Eakman et al. |
| 4,561,966 | A | 12/1985 | Owen et al. |
| 5,039,579 | A | 8/1991 | Kinoshita |
| 5,133,406 | A | 7/1992 | Puri |
| 5,232,793 | A | 8/1993 | Miyauchi et al. |
| 5,402,847 | A * | 4/1995 | Wilson ............... E21B 43/006 166/266 |
| 5,422,195 | A * | 6/1995 | Bernard ............. H01M 8/0258 429/415 |
| 5,536,488 | A | 7/1996 | Mansour et al. |
| 6,432,565 | B1 * | 8/2002 | Haines ............... E21B 43/164 429/416 |
| 7,459,226 | B2 * | 12/2008 | Huijsmans .......... H01M 8/0625 429/420 |
| 7,550,063 | B2 | 6/2009 | Gawad |
| 8,088,528 | B2 * | 1/2012 | Lourenco ............ F25J 1/0221 429/435 |
| 8,585,891 | B2 | 11/2013 | Lourenco et al. |
| 9,077,005 | B2 * | 7/2015 | Berlowitz ............ F02C 6/18 |
| 9,132,415 | B2 | 9/2015 | Lourenco et al. |
| 10,014,541 | B2 * | 7/2018 | Jamal .................. C01B 3/38 |
| 10,787,891 | B2 * | 9/2020 | Millar ................. H01M 8/04014 |
| 2003/0022035 | A1 | 1/2003 | Galloway |
| 2004/0229103 | A1 | 11/2004 | Seshadri et al. |
| 2005/0271914 | A1 | 12/2005 | Farooque et al. |
| 2006/0159967 | A1 | 7/2006 | Huijsmans et al. |
| 2008/0296018 | A1 | 12/2008 | Zubrin et al. |
| 2010/0163226 | A1 | 7/2010 | Zornes |
| 2011/0094940 | A1 | 4/2011 | Weisselberg |
| 2011/0163011 | A1 | 7/2011 | Yarbro |
| 2011/0206571 | A1 | 8/2011 | Skinner et al. |
| 2012/0251898 | A1 | 10/2012 | Lehar et al. |
| 2014/0272617 | A1 | 9/2014 | Berlowitz et al. |
| 2014/0338901 | A1 | 11/2014 | Sites et al. |
| 2015/0188172 | A1 | 7/2015 | Yun et al. |
| 2019/0071959 | A1 * | 3/2019 | Lourenco ............ C09K 8/594 |
| 2020/0165531 | A1 * | 5/2020 | Millar .................. C10G 31/08 |

FOREIGN PATENT DOCUMENTS

| | | |
|---|---|---|
| CA | 2641747 A1 | 10/2008 |
| CA | 2515999 C | 12/2012 |
| CA | 2920656 C | 3/2018 |
| CN | 101498229 A | 1/2008 |
| CN | 102937016 A | 2/2013 |
| GB | 977905 A | 12/1964 |
| GB | 2471862 A | 1/2011 |
| JP | 2006104261 A | 4/2006 |
| WO | 2005001977 A1 | 1/2005 |
| WO | 2010115283 A1 | 10/2010 |
| WO | 2011081665 A1 | 7/2011 |
| WO | 2012000115 A1 | 1/2012 |
| WO | 2012092404 A1 | 7/2012 |
| WO | 2014138208 A1 | 9/2014 |
| WO | 2015059507 A1 | 4/2015 |
| WO | 2015-106820 A1 | 7/2015 |

OTHER PUBLICATIONS

International Search Report dated Oct. 31, 2011, issued in International Application No. PCT/CA2011/050403, filed Jun. 30, 2011, 3 pages.
International Search Report and Written Opinion dated Feb. 24, 2014, issued in International Application No. PCT/CA2013/050955, filed Dec. 12, 2013, 7 pages.
International Search Report and Written Opinion dated Jun. 20, 2016, issued in International Application No. PCT/CA2015/051022, filed Oct. 8, 2015, 7 pages.
Jacobs Consultancy, "Evaluation of Integrating a Molten Carbonate Fuel Cell (MCFC) with a SADG Facility" prepared for Alberta Innovates—Energy and Environment Solutions, Jul. 2015, 77 pages.
International Search Report and Written Opinion dated Feb. 21, 2017, issued in International Application No. PCT/CA2016/051408, filed Dec. 1, 2016, 9 pages.
Hisato, A., "Upgrading of Heavy Cruse Oil—Supercritical Water Cracking Technology", JOGMEC Techno Forum 2014, Nov. 26-27, 2014.
Hill, R., et al., "Application of molten carbonate fuel cell for CO2 capture in thermal in situ oil sands facilities," International Journal of Greenhouse Gas Control 41(2015) 276-284.
Hamelinck, C.N., et al., "Potential for CO2 sequestration and Enhanced Coalbed Methane production in the Netherlands," NOVEM Programme No. 234.1, Mar. 2001 (ISBN 90-5847-020-4).
International Search Report and Written Opinion dated May 31, 2016, issued in International Application No. PCT/CA2015/051136, filed Nov. 4, 2015, 13 pages.
International Search Report and Written Opinion dated Mar. 27, 2017, issued in International Application No. PCT/CA2017/050062, filed Jan. 20, 2017, 7 pages.

* cited by examiner

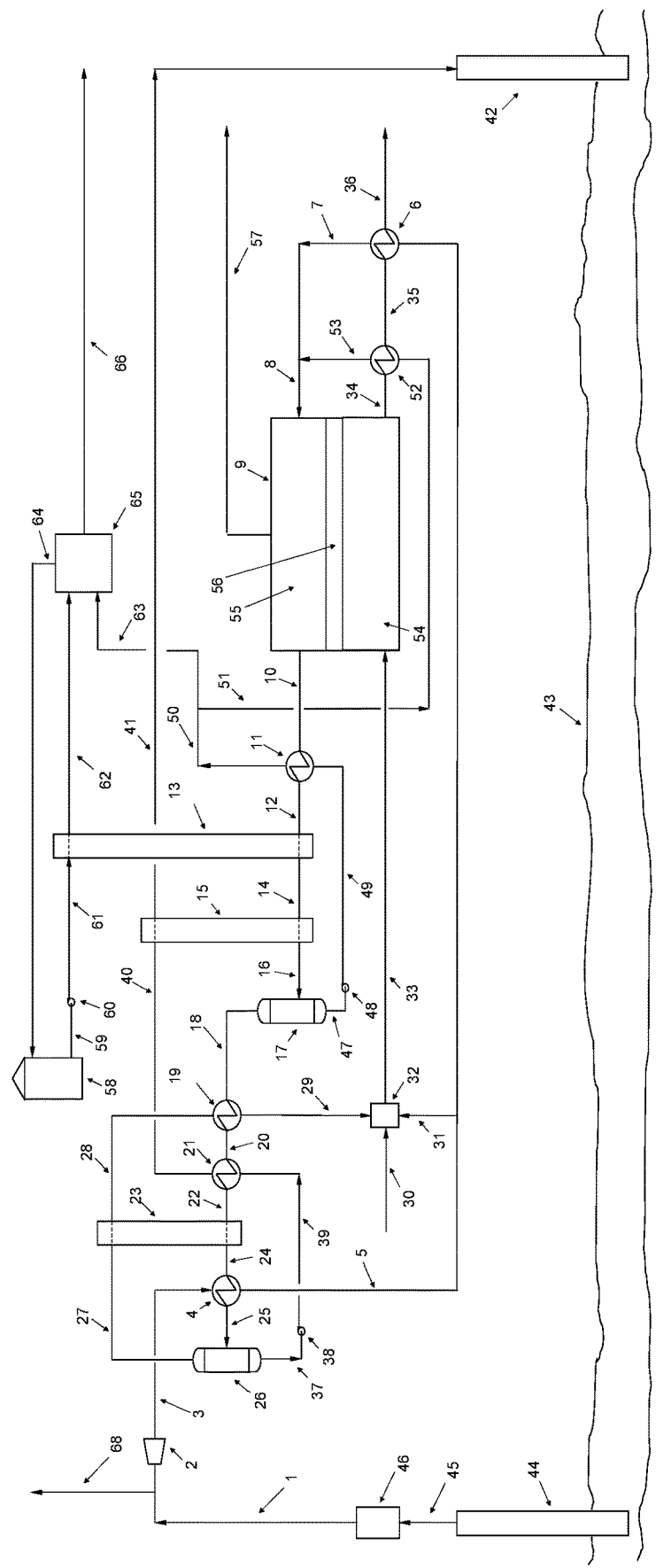

METHOD OF EXTRACTING COAL BED METHANE USING CARBON DIOXIDE

FIELD

This relates to a process that displaces and extracts methane from a coal bed by storing carbon dioxide produced in a fuel cell.

BACKGROUND

The generation of electricity in North America and in most parts of the world is primarily provided by the combustion of coal, a cheap and abundant fossil fuel. Coal is typically mined and transported to a power plant where it is processed before combustion. The coal is combusted in a furnace to generate heat for the production of high pressure dry steam. The produced dry and superheated steam drives a steam turbine generator to produce electricity. Coal is a high carbon content fuel, therefore a large emitter of carbon dioxide as well as NOx and SOx, greenhouse gases (GHG). Rapidly increasing concentrations of GHG's in the atmosphere and emerging evidence of global warming is now triggering international action to reduce GHG's emissions into the atmosphere. The combustion of coal to generate electricity is identified as a main contributor of GHG emissions, hence industry action is required to substantially reduce or eliminate GHG emissions from the use of coal combustion. Recently, the government of Alberta has mandated that combustion of coal for power generation be terminated by the year 2030.

Coal bed methane extraction provides an alternative to recover energy from coal in a safe, efficient and environmentally more acceptable energy source. Coal bed methane extraction is typically employed in unmineable coal beds. Presently coal bed methane extraction provides approximately 7% of the natural gas needs in the USA.

In the current standard mode of coal bed methane extraction, wells are drilled into a coal seam. The methane is extracted by desorption from coal surfaces where the reservoir pressure is first decreased by dewatering. The decrease in pressure allows the methane to desorb from the coal and flow as a gas to the well. The gas is processed at surface and compressed in a natural gas pipeline network for delivery to markets.

More recently, to enhance coal bed methane extraction new methods have been developed. Reducing the partial pressure of methane by injecting other gases such as nitrogen, resulted in a substantial increment in production but once the nitrogen brakes through it produces a diluted methane gas stream, requiring further processing at surface before compression into pipeline.

Another method is the injection of carbon dioxide to replace and extract methane from the coal. Carbon dioxide is first recovered from a combustion flue gas stream, compressed and delivered by pipeline to a coal bed injection well for sequestration. This method is dependent on the economics of recovering, compressing and delivering a carbon dioxide stream from its point of origin to its point of use. Due to its high costs of recovery, compression and delivery its use is limited. There is a need for a coal bed methane process that allows for the extraction of methane to produce electricity and sequester the produced GHG emissions safely and economically.

SUMMARY

According to an aspect, there is provided a process that extracts methane from a coal bed. The extracted methane is electrochemically reacted in a fuel cell to produce; electricity, carbon dioxide, water and nitrogen. The clean produced water is used or discharged into the environment. The nitrogen, an inert gas is used or discharged into the atmosphere. The carbon dioxide is pressurized, heated and injected into the coal bed for sequestration and methane extraction. Coal bed methane extraction works by replacing sorbed methane molecules with more strongly sorbed carbon dioxide molecules. Coal selectivity of carbon dioxide to methane is greater than 2 to 1, coal adsorbs and stores 2 molecules or more of carbon dioxide for every molecule of methane displaced, the carbon dioxide remains adsorbed in the coal. The extracted methane is captured, processed and routed to the fuel cell to generate electricity. The proposed invention extracts its own fuel to generate electricity and store its own GHG emissions.

The process will generally be a net producer of water, as the stoichiometric reaction of methane with oxygen generates 2.25 Kg of water per Kg of methane consumed. The use of a fuel cell provides the ability to extract and consume methane from a coal bed to generate electricity, water, carbon dioxide and nitrogen.

According to an aspect, there is provided a process that displaces and extracts methane from a coal bed by storing carbon dioxide produced in a fuel cell. The extracted methane is processed and consumed in a fuel cell to produce electricity, a stream of carbon dioxide, a stream of water and a stream of nitrogen. The process recovers the anode fuel cell exhaust stream and its thermal energy to produce concentrated fluid streams of carbon dioxide and water. The produced carbon dioxide stream is injected into the coal bed for sequestration, coal has a stronger affinity for carbon dioxide, hence it displaces coal methane that is recovered and processed for consumption in the fuel cell. The recovered anode exhaust water stream is free of dissolved solids and is heated to provide thermal energy and other uses. The nitrogen stream thermal energy is first recovered the cooled nitrogen can also be recovered as a commodity for other uses or simply released into the atmosphere.

The objective of the process is to produce coal bed methane, a clean energy fuel source to generate electricity in a fuel cell. The carbon dioxide produced in the fuel cell is recovered and injected into the coal bed for storage, displacement and extraction of methane.

According to an aspect, there is provided a method to extract and consume methane from a coal bed to generate electricity GHG emissions free. The process recovers the anode exhaust stream and its thermal energy from a power generation methane fuel cell to produce two streams; a water stream and a carbon dioxide stream.

The process of generating power with methane gas fuel cell differs from standard power generation plants that consume methane gas. In a fuel cell, methane gas is consumed by an electrochemical reaction to produce electricity and two exhaust gas streams; the anode exhaust stream of water vapor and carbon dioxide and the cathode exhaust stream of mainly nitrogen.

The standard power generation processes combusts methane gas to produce electricity and a large single exhaust gas stream, a mixture of gases, the largest concentration being nitrogen oxides (NOx). In this single exhaust stream, the concentrations of carbon dioxide and water are smaller and hence more challenging and costly to recover and use.

According to an aspect, the method injects carbon dioxide produced by the fuel cell at optimum conditions in terms of pressure and temperature into a coal bed to sequester and extract methane from coal. The definition of optimum conditions is dependent on coal bed depth relative to pressure and methane extraction enhancement relative to temperature. The extracted methane is recovered, processed and routed to a fuel cell to generate electricity. The fuel cell anode exhaust stream of carbon dioxide and water is condensed to produce liquid streams of carbon dioxide and water. The fuel cell cathode exhaust stream of nitrogen is cooled for thermal energy recovery.

According to an aspect, the process features may include one or more of the following:

- A power generation process that extracts its own methane fuel from a coal bed.
- The power generation process does not emit GHG's.
- The power generation process uses a fuel cell to electrochemically react the extracted and processed methane to generate electricity and produce two distinct exhaust streams; an anode exhaust stream and a cathode exhaust stream.
- The fuel cell anode exhaust stream of carbon dioxide and water vapour is condensed to produce liquid streams.
- The liquid stream of carbon dioxide is pressurized and heated to coal bed optimum conditions for sequestration into coal and extraction of methane.
- The liquid stream of water, free of dissolved solids is used to generate steam for other uses.
- The fuel cell cathode exhaust stream thermal energy is recovered to enhance process thermal operation.
- The use of coal, to sequester carbon dioxide and extract methane to produce electricity.
- The production of clean water, free of dissolved solids from methane gas, 2.25 Kg of water is produced per Kg of methane consumed in a fuel cell.

According to an aspect, electricity may be generated in a fuel cell fueled by methane extracted from a coal bed. The fuel cell produced carbon dioxide is recovered and injected at optimum pressure and temperature conditions into the coal bed to be adsorbed in the coal and displace methane. The process may comprise:

(a) First, extracting methane from a coal bed with carbon dioxide.
(b) Second, processing the coal bed extracted methane gas to supply a fuel cell.
(c) Third, reduce the processed methane gas pressure supply to fuel cell through an expander generator, producing electricity and a chilled methane gas stream.
(d) Fourth, the chilled methane gas stream gives up its coolth energy in a counter-current flow with gaseous anode exhaust stream to cool and condense carbon dioxide.
(e) Fifth, the heated methane gas supply to fuel cell is further heated in another counter-current heat exchanger by the cathode exhaust gaseous stream.
(f) Sixth, the heated methane gas supply enters the fuel cell anode where it is converted by steam reforming into hydrogen and carbon dioxide.
(g) Seventh, the hydrogen is reacted with carbonate ion through electrochemical reactions to produce electricity and a high temperature anode exhaust gas stream of water, carbon dioxide and traces of unreacted hydrogen.
(h) Eighth, gaseous carbon dioxide is mixed with fresh air and catalysed in a catalytic oxidizer to heat this oxidant stream up to fuel cell cathode temperature. At the cathode, oxygen in the fuel cell air supply reacts with carbon dioxide to produce a carbonate ion which is transferred through the fuel cell electrolyte layer to the anode to react with hydrogen producing; water, carbon dioxide and electricity.
(i) Ninth, the high temperature anode exhaust gas stream is first pre-cooled in a counter-current flow heat exchanger with the recovered water stream.
(j) Tenth, the anode exhaust gas stream is further cooled in a counter-current flow heat exchanger with the recovered carbon dioxide condensing the water fraction in the anode exhaust gas stream.
(k) Eleventh, separate the condensed water fraction in the anode exhaust gas stream at a gas/liquid separator and route the separated anode exhaust gaseous carbon dioxide stream for further cooling in a counter-current heat exchanger with recovered liquid carbon dioxide stream.
(l) Twelfth, further cool the anode exhaust gaseous carbon dioxide stream in a counter-current heat exchanger with cold separated carbon dioxide gaseous stream.
(m) Thirteenth, further cool the anode exhaust carbon dioxide stream in a counter-current heat exchanger with the chilled methane fuel cell gas supply stream to condense the carbon dioxide.
(n) Fourteenth, pump at a controlled pressure the recovered liquid carbon dioxide stream and heat it in heat exchangers in a counter-current flow with the anode exhaust stream.
(o) Fifteenth, route the pressure and temperature controlled carbon dioxide stream into a coal bed to displace methane and be absorbed in the coal.
(p) Sixteenth, pump the anode exhaust recovered water and heat it in heat exchangers in a counter-current flow with the anode exhaust stream to recover the fuel cell exhaust thermal energy.
(q) Seventeenth, route the pressurized and heated water stream into two streams. One stream to the anode steam reformer and the other to other thermal uses.
(r) Eighteenth, provide further cooling as required to the anode exhaust stream by a recycling heat recovery condensate stream through a heat exchanger in a counter current flow to recover fuel cell exhaust thermal energy.

According to an aspect, the process extracts methane from a coal bed to supply a fuel cell to produce electricity and may include the following steps: first, processing extracted coal bed methane; second, supply the processed methane to a fuel cell to generate electricity; third, recover fuel cell anode exhaust carbon dioxide stream and pump it into coal bed to displace methane and be absorbed in the coal; fourth, recover fuel cell anode exhaust water stream to produce water.

According to an aspect the process replaces methane in a coal bed with carbon dioxide. The extracted methane fuels an electrochemical fuel cell to generate electricity GHG emissions free and produce water free of dissolved solids.

The presently described method was developed with a view to extract methane from a coal bed with carbon dioxide. The extracted methane fuels a power generation fuel cell. The produced carbon dioxide in the fuel cell anode exhaust stream is condensed, recovered and pumped into the coal bed to displace methane and be absorbed in the coal. The process main features are generation of electricity free of GHG emissions and production of water free of dissolved solids. The process stores GHG emissions and simultaneously increases methane production and supply, thus becoming a major contributor of clean abundant energy.

As will hereinafter be further described, according to an aspect, carbon dioxide is recovered from a fuel cell anode exhaust stream and pumped into a coal bed to displace methane. The carbon dioxide is adsorbed in the coal bed. The extracted coal bed methane is processed to supply a fuel cell. The processed methane pressure is reduced through a gas expander/generator to produce electricity and a chilled methane gas stream. The chilled methane gas stream gives up its coolth energy in a counter-current heat exchanger with a separated anode exhaust gaseous stream to condense and produce liquid carbon dioxide. The fuel cell methane gas supply is further heated in counter current heat exchangers, fed to the fuel cell anode and steam reformed to produce hydrogen and carbon dioxide. The hydrogen reacts with a carbonate ion to produce water, carbon dioxide and electricity. The anode hot exhaust gas stream of carbon dioxide, water and traces of hydrogen, is cooled, condensed, separated and recovered. A gaseous portion of carbon dioxide and traces of hydrogen is recycled to the fuel cell cathode to produce carbonate ions. The liquefied carbon dioxide stream is pressurized and re-heated for injection into a coal bed to extract methane gas and to be sequestered. The current industry practices to extract coal bed methane is by dewatering the formation to lower the reservoir pressure, lowering the pressure liberates the methane gas adsorbed on the coal which then flows through the cracks to the well bore.

According to an aspect, an objective of the process is to enhance coal bed methane extraction by pumping recovered carbon dioxide for adsorption in coal to liberate methane. The extracted methane supplies a fuel cell to produce electricity.

According to an aspect, there is provided a method of producing methane from a coal bed by pumping carbon dioxide into a coal seam of the coal bed to be adsorbed on the coal while displacing and extracting methane from the coal bed, the extracted methane being used to supply a fuel cell for the generation of electricity. The method comprising the steps of: identifying a coal bed suitable for the sequestration of carbon dioxide and the production of methane; producing coal bed methane from the coal bed and processing at least a portion of the coal bed methane in a coal bed methane processing unit to prepare and supply methane as a fuel input for a fuel cell; operating the fuel cell to generate electricity and an anode exhaust stream, the fuel cell being fuelled by the processed coal bed methane; passing the fuel cell anode exhaust stream through a series of heat exchangers to condense a steam component of the anode exhaust stream; providing a first separator for obtaining a condensed steam stream and a gaseous carbon dioxide stream from the anode exhaust stream; providing a series of heat exchangers to condense the gaseous carbon dioxide stream; providing a second separator for obtaining a condensed carbon dioxide stream and a remaining gaseous carbon dioxide stream from the gaseous carbon dioxide stream, the remaining gaseous carbon dioxide stream being supplied to a cathode of the fuel cell for use as a fuel cell input; and pressurizing the condensed carbon dioxide stream in a pump and injecting the pressurized condensed carbon dioxide stream into the coal bed for sequestration and displacement of coal bed methane.

According to other aspects, the method may comprise one or more of the following features in any practical combination: the method may further comprise the step of pressurizing at least a portion of the condensed steam stream in a pump and supplying pressurized condensed steam stream for use as a fuel cell input; the coal bed methane processing unit may comprise a gas expander/generator, and the method may further comprise the step of reducing the pressure and temperature of the processed coal bed methane to generate electricity and condition the produced coal bed methane; the fuel cell may be located immediately adjacent to the coal bed; and a portion of the produced methane may be diverted to an external destination, or the entire produced methane may be supplied to the fuel cell as the fuel source.

According to an aspect, there is provided a method of producing methane from a coal bed accessible from a well site, comprising the steps of: operating a fuel cell to generate electricity and an exhaust stream, the exhaust stream comprising at least carbon dioxide and steam; injecting at least a portion of the exhaust stream into the coal bed such that the carbon dioxide displaces methane in the coal bed and is sequestered in the coal bed; producing methane from the coal bed; and supplying at least a portion of the produced methane to the fuel cell as a fuel source.

According to other aspects, the method may comprise one or more of the following features in any practical combination: the method may further comprise the step of separating a stream of carbon dioxide from the waste stream; the method may further comprise the step of condensing the steam and separating the resultant water from the exhaust stream; the method may further comprising the step of passing the produced methane through an expander/generator to reduce the pressure prior to being introduced into the fuel cell; the method may further comprise the step of passing the exhaust stream through a series of heat exchangers to condense the steam and at least a portion of the carbon dioxide in the exhaust stream; the method may further comprise the step of separating a second stream of carbon dioxide and supplying the second stream of carbon dioxide to the fuel cell as a reactant; the fuel cell may be located immediately adjacent to the coal bed; and a portion of the produced methane is diverted to an external destination, or the entire produced methane may be supplied to the fuel cell as the fuel source.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

The FIGURE is a schematic diagram of a coal bed methane extraction process to supply a power generation fuel cell plant. It includes the recovery of its anode exhaust stream, of which carbon dioxide is pumped into the coal bed for storage.

DETAILED DESCRIPTION OF THE PREFERRED EMBODIMENT

An example of the method will now be described with reference to the FIGURE. The depicted process and method was developed with a view to pump carbon dioxide recovered from a fuel cell anode exhaust stream to be stored in a coal bed and simultaneously increase the production of coal bed methane to supply a fuel cell for the generation of electricity. The process utilizes a different approach in a variant of producing a fuel supply for a fuel cell to generate electricity and to recover and store its GHG emissions. The system here described takes advantage of recovering a fuel cell anode exhaust gas stream to enhance coal bed methane production.

Referring to the FIGURE, a preferred method of recovering a fuel cell anode exhaust stream of carbon dioxide to pump into a coal bed for sequestration and simultaneously increasing coal bed methane extraction is depicted. Fuel cells, such as the Direct Fuel Cell (DFC) manufactured by Fuel Cell Energy in the USA, have been available since 2003. The largest DFC power generation plant is a 59 MW. A major advantage of a DFC power generation plant versus standard combustion power generation plants is the smaller mass flow rate of the anode exhaust gas stream with a high concentration of carbon dioxide and water, allowing for ease of recovery and use.

To generate electricity in a fuel cell, coal bed methane gas is first extracted from a coal bed seam 43, collected in well 44 and flowed through stream 45 to be processed in unit 46. The dry methane stream 1 is routed to an expander/generator 2 to reduce the methane gas pressure to meet fuel cell inlet pressure stream 3, where the temperature of stream 3 is decreased roughly from 1.5 to 2 degrees Celsius for every 15 psi pressure drop. Alternatively, methane may also be diverted along line 68 to another destination for other purposes, such as for distribution in a natural gas pipeline, for use by other equipment, or otherwise. While line 68 is shown immediately downstream of well 44, it will be understood that it may be at any location prior to being introduced into fuel cell 9 may be up or downstream of other equipment. The cooler methane gas stream 3 from expander/generator 2 enters heat exchanger 4 to give up its coolth energy to stream 24. A portion of methane gas stream 5 is routed through stream 31 to provide gas to air pre-heater 32 and the balance of stream 5 is further heated in heat exchanger 6 by fuel cell cathode exhaust stream 35. The heated fuel cell supply gas stream 7 is mixed with steam stream 53, and enters the fuel cell 9 at anode section 55, through stream 8. At fuel cell anode 55, the methane gas/steam stream 8 is first reformed to produce hydrogen and carbon dioxide. The hydrogen passes through an electrochemical reaction with a carbonate ion produced in cathode 54 and is transferred through an electrolyte layer 56 to the anode 55, where it produces electricity stream 57 and a hot anode exhaust stream 10. The carbonate ion produced in cathode 54 and transferred through electrolyte layer 56 into anode 55 is converted back to carbon dioxide in the electrochemical reaction. The main components of hot anode exhaust stream 10 are steam and carbon dioxide with some residual hydrogen. The hot anode exhaust stream 10 enters heat exchanger 11 to give up some of its heat to water stream 49, the cooler anode exhaust stream 12 is further cooled in heat exchanger 13 to give up more of its heat to cooling circulating stream 61, and anode exhaust stream 14 is further cooled in heat exchanger 15 to give up more of its heat to carbon dioxide stream 40. The cooler anode exhaust stream 16 enters separator 17 to separate and collect the condensed water component of the anode exhaust stream 15. The concentrated carbon dioxide anode exhaust stream 18 exits separator 17 and is further cooled in heat exchanger 19 by carbon dioxide stream 28. The colder concentrated carbon dioxide anode exhaust 20 is further cooled in heat exchanger 21 by liquid carbon dioxide stream 39, the colder stream 22 and further cooled in heat exchanger 23 by gaseous carbon dioxide stream 27, followed by yet more cooling in heat exchanger 4 by methane stream 3. The cold concentrated carbon dioxide anode exhaust stream 25 enters carbon dioxide separator 26 where the condensed carbon dioxide is separated from the gaseous carbon dioxide and residual hydrogen. The gaseous cold carbon dioxide stream and residual hydrogen stream 27 enters heat exchanger 23 to give up some of its coolth energy to anode exhaust stream 22, the warmer carbon dioxide stream 28 is further heated in heat exchanger 19 by anode exhaust stream 18, the heated gaseous carbon dioxide and residual hydrogen stream 29 is mixed with air stream 30 at air pre-heater 32 where the residual hydrogen is catalytic oxidized and the oxidant stream 33 is heated to cathode 54 temperature. At fuel cell cathode 54, oxygen from air stream 30 reacts with carbon dioxide from stream 29 to produce carbonate ions for transfer through electrolyte layer 56 to the fuel cell anode 55. The hot cathode exhaust stream exits fuel cell cathode 54 through stream 34, mainly nitrogen with residuals of carbon dioxide, water vapour and oxygen, enters heat exchanger 52 to further heat water stream 51 and produce a steam stream 53 to mix with heated methane gas stream 7, the mixed stream 8 is fed to the fuel cell anode 55 reformer to produce hydrogen and carbon dioxide. The cathode exhaust stream 35 is further cooled in heat exchanger 6, heating fuel cell anode methane gas supply stream 5 and is exhausted into the atmosphere through stream 36. The recovered water from anode exhaust stream 16, exits separator 17 through stream 47 and pressurized by pump 48 into stream 49. The pressurized water stream 49 enters heat exchanger 11 to recover the thermal energy from anode exhaust stream 10. A slipstream 51 from heated water stream 50 is routed to heat exchanger 52 to produce steam for fuel cell anode 55 reformer. The net water produced stream 63 is routed to thermal recovery energy unit 65 and other uses. The recovered liquid carbon dioxide exits separator 26 through stream 37 and pumped to pressure by pump 38. The pressurized carbon dioxide stream 39 is routed through heat exchanger 21 to give up its coolth energy, the warmer carbon dioxide stream 40 is further heated in heat exchanger 13 to produce an heated carbon dioxide stream 41.

The recovered and heated carbon dioxide streams 41 are routed to coal bed injection well 42 to be used in the production of natural gas. In particular, the carbon dioxide will be sequestered in coal bed 43 and displace and extract coal bed methane gases into coal bed production well 44. Prior to being injected, the temperature and pressure of stream 41 will be adjusted to be suitable for injection. The temperature and pressure constrains will depend in part on characteristics of the well, such as a minimum pressure to allow the fluid to be injected or a maximum safe operating pressure to avoid damaging the formation, as well as characteristics of the equipment being used to stay within safe operating conditions.

The recovered and heated water stream 63 is routed to thermal energy recovery unit 65. The recovered thermal energy produces two water condensate streams 64 and 66. Water condensate stream 64 is routed to condensate storage tank 58. Water condensate stream 59 from storage tank 58 is pressurized through pump 60 and routed through stream 61 to heat exchanger 13 to provide controlled cooling to fuel cell anode exhaust stream 12. The heated water stream 62 enters thermal recovery unit 65. Water condensate stream 66 exits thermal recovery unit 65 for other uses.

As will be noted above, the streams are preferably in a liquid phase when being pressurized or transported, such that a pump may be used, rather than a compressor, which would be required for pressurizing a gas phase. In general, pumps are less expensive than compressors, and require less energy to pressurize the fluids. However, it will be understood that the process may be modified to rely on compressors instead of pumps, and this may be necessary, depending on the operating pressure and temperature ranges.

A main benefit of the process is that it allows methane to be extracted from a coal bed to supply a fuel cell, which is then used to supply a fuel cell to generate electricity. By recovering carbon dioxide from the waste stream, and pumping the recovered carbon dioxide into the coal bed, the carbon dioxide is adsorbed to the coal and sequestered in the coal bed, while also enhancing the production of methane through displacement. This allows a user to reduce or eliminate any GHG emissions, while enhancing the production of methane, and also generating electricity. The methane may be used entirely to fuel the fuel cell, or a portion may be diverted for use elsewhere. In addition, the process allows thermal energy from the anode exhaust stream to be recovered by condensing the water and carbon dioxide and used, and also produces clean water, free of dissolved water, which can be condensed from the waste stream as the thermal energy is recovered. The process allows for an efficient recovery of components and thermal energy from a fuel cell anode exhaust stream to sequester in a coal bed the GHG emissions produced by a fuel cell, while simultaneously increasing coal bed methane extraction to supply the fuel cell. This allows for a clean energy source of methane to produce electricity.

It will be understood that the system shown in The FIGURE may be modified according to preferences of the user, and may be modified to suit a particular environment, or a particular outcome. Furthermore, while the discussion above relates to an optimized process for producing useful streams of methane, electricity, water, and thermal energy, the process may be modified to suit other requirements and situations. For example, rather than separating the carbon dioxide and water from the anode exhaust stream, exhaust may be injected into the well without any separation, although it may be necessary to condition the exhaust to a useable temperature and pressure prior to injection.

The fuel cell is preferably located at or immediately adjacent to the underground coal formation, or the portion of the formation being actively produced such that the methane can be introduced to the fuel cell without having to be transported, and such that the exhaust streams can be injected directly into to the wells from the equipment described above. As the formation may have a number of injection and production wells, the streams of fluid may be piped to the appropriate well.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A method of producing methane from a coal bed by pumping carbon dioxide into a coal seam of the coal bed to be adsorbed on the coal while displacing and extracting methane from the coal bed, the extracted methane being used to supply a fuel cell for the generation of electricity, the method comprising the steps of:
   identifying a coal bed suitable for sequestering carbon dioxide and producing methane;
   producing coal bed methane from the coal bed and processing the coal bed methane in a coal bed methane processing unit to prepare and supply at least a portion of the methane as a fuel input for a fuel cell;
   operating the fuel cell to generate electricity and an anode exhaust stream, the fuel cell being fuelled by the processed coal bed methane;
   passing the fuel cell anode exhaust stream through a first set of heat exchangers to cool the fuel cell anode exhaust stream and condense a steam component of the anode exhaust stream;
   separating the anode exhaust stream into a condensed steam stream and a gaseous carbon dioxide stream in a first separator;
   cooling the gaseous carbon dioxide stream in a second set of heat exchangers to produce a condensed carbon dioxide stream;
   separating the condensed carbon dioxide stream and a remaining gaseous carbon dioxide stream from the gaseous carbon dioxide stream in a second separator, the remaining gaseous carbon dioxide stream being supplied to a cathode of the fuel cell for use as a fuel cell input; and
   pressurizing the condensed carbon dioxide stream in a pump to a pressure that is greater than a formation pressure of the coal bed, the condensed carbon dioxide being uncompressed relative to the fuel cell anode exhaust stream prior to being pressurized in the pump;
   warming the pressurized condensed carbon dioxide stream in at least the second set of heat exchangers to produce an injection stream of carbon dioxide, the injection stream comprising a temperature that is suitable to produce methane from the coal bed; and
   injecting the injection stream of carbon dioxide into the coal bed for sequestration and displacement of coal bed methane.

2. The method of claim 1, further comprising the step of pressurizing at least a portion of the condensed steam stream in a pump and supplying pressurized condensed steam stream for use as a fuel cell input.

3. The method of claim 1, wherein the coal bed methane processing unit comprises a gas expander generator, and further comprising the step of reducing the pressure and temperature of the processed coal bed methane to generate electricity and condition the produced coal bed methane.

4. The method of claim 1, wherein the fuel cell is located immediately adjacent to the coal bed.

5. The method of claim 1, wherein a portion of the produced methane is diverted to an external destination.

6. The method of claim 1, wherein the entirety of the produced methane is supplied to the fuel cell as the fuel source.

7. The method of claim 1, wherein at least one heat exchanger of the first set of heat exchangers is cooled by the condensed steam stream.

8. The method of claim 1, wherein the pressurized condensed carbon dioxide stream is further warmed in at least one heat exchanger of the first set of heat exchangers.

9. The method of claim 1, wherein the remaining gaseous carbon dioxide stream is warmed by at least one heat exchanger of the second set of heat exchangers prior to being supplied to the cathode of the fuel cell.

* * * * *